Patented Feb. 6, 1940

2,189,338

UNITED STATES PATENT OFFICE 2,189,338

CELLULOSE DERIVATIVE COMPOSITION

Shailer L. Bass and Edgar C. Britton, Midland, Mich., assignors to The Dow Chemical Company, Midland, Mich., a corporation of Michigan No Drawing. Application December 27, 1938, Serial No. 247,832

5 Claims. (Cl. 106—40)

This invention relates to cellulose derivative compositions, and particularly to compositions plasticized with certain poly-halogenated diphenyloxide derivatives.

Most of the plasticizers employed in cellulose derivative compositions soften the cellulose derivative, while at the same time modifying its flexibility and extensibility. When it is desired to produce a molding plastic from a cellulose derivative, one of the common plasticizers is added to the said derivative in sufficient quantity to produce the desired degree of plastic flow at moderate molding temperatures. The desired plastic properties in the composition are usually attained at the expense of the hardness of the product at room temperature since the softening effect of most plasticizers is the most noticeable property contributed to the composition.

It is highly desirable that a plasticizer have low volatility so that it will not evaporate from the plasticized composition on aging or at molding temperatures; it should be resistant to attack by water, acids and alkali; insoluble in oils and greases; resistant to discoloration and exposure to sunlight; and compositions containing the plasticizer should remain flexible at low temperatures. Few, if any, of the known plasticizers contribute all of the desired properties to cellulose derivative compositions and most of the heretofore known plasticizers fail entirely to provide cellulose derivative compositions wherein the cellulose derivative retains most of its hardness while at the same time undergoing an increase in toughness, flexibility, and dielectric properties. A plasticizer which would produce an increase in toughness and flexibility without unduly softening the cellulose derivative is much to be desired.

Ethyl cellulose has recently become of commercial importance in the preparation of plastics and coating compositions. This cellulose derivative is inherently softer, tougher, and more extensible than the cellulose esters such as nitrocellulose and cellulose acetate. Ethyl cellulose is also more generally compatible with the customary plasticizers than are the other cellulose derivatives. The problem which exists in preparing an ethyl cellulose plastic is to provide one having practical flow characteristics and having sufficient toughness and flexibilty at room temperature to meet the demands of service without unduly softening the plastic. A plasticizer must be added to ethyl cellulose for many purposes in order to modify the molding characteristics so that it may be readily deformed at moderate pressures and temperatures. The same problem exists in connection with the other cellulose ethers and particularly the lower alkyl ethers of cellulose. The problem of plasticizing benzyl cellulose is similar to that of ethyl cellulose but is made more difficult because of the inherently greater softness of benzyl cellulose and the tendency of the latter to be softened and weakened by the addition of even small quantities of the usual plasticizers.

It must be remembered that the hardness, toughness, and extensibility desired in cellulose derivative compositions is largely determined by the use to which such compositions may be put. Plastics for injection molding must flow well at molding temperatures but should harden rapidly at lower temperatures. They should be hard enough when cold to withstand scratching, and tough enough to withstand shock. Plastics for extrusion coating of wire, for example, must flow well, have high flexibility at all temperatures met with in service, and be sufficiently hard and tough to withstand abrasion. In addition, the composition must provide good electrical insulation. Similarly, lacquer coatings must be hard, tough, and possess elastic extensibility to prevent cracking. In addition, retention of flexibility on exposure to light and heat is desirable. Fabric coatings should be flexible, hard, glossy, and free from tackiness and be resistant to discoloration by alkalies and detergents.

It is accordingly an object of the present invention to provide cellulose derivative compositions comprising a plasticizer which increases the toughness and flexibility of the cellulose derivative without unduly softening the same. It is another object of the invention to provide new plastic compositions, comprising cellulose derivatives and such plasticizers, which have good strength characteristics and which are nearly as hard and in many instances harder than the cellulose derivative alone. It is a further object of the invention to provide cellulose derivative plastics having good flow characteristics, high degree of flexibility at all temperatures met with in service, and sufficient hardness and toughness to withstand abrasion. It is a further object to provide such a composition having good electrical insulation properties. It is another object of the invention to provide such compositions which are flexible, hard, glossy, free from tackiness, and resistant to discoloration by alkalies and detergents, or on exposure to light. Other objects of the invention will become apparent as the description proceeds.

According to the invention, the foregoing and related objects may be attained in a cellulose derivative composition plasticized with one or a combination of polybrominated diaryl ethers having the formula

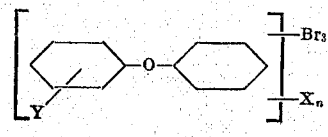

wherein Y is a member of the class consisting of the phenyl group and hydrogen, X is at least one of the halogens,—chlorine and bromine, and n is a numeral from 1 to 3. The preferred compositions contain varying amounts of the plasticizer depending on the use of requirements. Thus, molding plastics contain from 5 to 40 parts of a plasticizer conforming to the foregoing general formula, per 100 parts of the cellulose derivative. Wire coating compositions, and those for the extrusion of flexible tubing, may contain up to about 100 parts of plasticizer per 100 parts of the cellulose derivative. Lacquer coatings may contain up to 100 parts or more of plasticizer per 100 parts of the cellulose derivative.

Compounds falling under the foregoing general formula will contain at least 4 and as many as 6 halogen atoms. Of the possible 6 halogen atoms at least 3 are always bromine and not more than 3 may be chlorine. The aryl ethers from which the halogenated products are prepared are phenyl ether (diphenyloxide) and phenyl-diphenyl ether. Examples of the compounds which we have found useful for the present purpose include tribromo-mono-chloro-diphenyloxide, tribromo-dichloro-diphenyloxide, pentabromo-mono-chloro-diphenyloxide, tetrabromo-dichloro-diphenyloxide, hexabromo-diphenyloxide, dibromo-phenyl-diphenyloxide, pentabromo-mono-chloro-phenyl-diphenyloxide, and hexabromo-phenyl-diphenyloxide. In most instances the materials employed are a mixture of isomers or of adjacent substitution products rather than pure individual compounds. The average analysis in each case was such as to conform to the general formula given above. The desired properties are found to be contributed to cellulose derivative compositions only when the poly-halogenated diphenyloxide derivatives contain at least 4 halogen atoms of which at least 3 are bromine. The lower halogenated derivatives and those containing more chlorine than bromine were found to fall within the general class which we may refer to here as "softening plasticizers" for the cellulose derivatives in contradistinction to the group with which we are here concerned and which we may designate as "hardening plasticizers."

The poly-halogenated diphenyloxide derivatives with which the invention is concerned impart to cellulose derivative compositions an unusual combination of the desirable qualities of extensibility, hardness, toughness, and electrical insulation. In general, cellulose derivative compositions consisting of 15 parts of one or more of the new plasticizers for each 100 parts of cellulose derivative, exhibits a hardness index of at least 90. The hardness index of a cellulose derivative composition is the hardness of that composition reported in terms of the percent relation between the said hardness and that of the original unplasticized cellulose derivative. Thus a "blank" for any cellulose derivative is 100. Most of the common plasticizers at 15 per cent concentration produce cellulose derivative compositions having a hardness index ranging from 35 to about 75. The plasticizers of the present invention in like concentration yield compositions whose hardness index is at least 90 and in many instances is as high as 135 to 140. The surprising feature is that the hardness of the cellulose derivative is not only retained or improved but that the tensile strength of the composition is not materially reduced.

The hardness index of cellulose derivative compositions is an especially desirable property to keep in mind when selecting extrusion coating compositions such as those employed in the preparation of insulated electric wire. The hardness index may be considered an index of the resistance of the extruded coating to abrasion. When a composition has both high hardness index and good flexibility rating accompanied by suitable tensile strength and elongation properties, the composition may be employed under the strenuous conditions to which coated wire is subjected. Because of the unusual retention of hardness resulting from the introduction of the herein-described plasticizer, the compositions of the present invention are particularly adapted for use as molding and extrusion plastics.

The following tables set forth briefly a few of the properties of some of the poly-halogenated diphenyloxide derivatives which we have found satisfactory for the present purpose and the properties of some ethyl cellulose compositions wherein these compounds were employed as plasticizers.

Table I

| No. | Plasticizer name | Boiling range | Refractive index | Physical form |
|---|---|---|---|---|
| 1 | Tetrabromo-mono-chloro-diphenyloxide. | 239–267° C. at 7 mm | 1.6615 | Light yellow liquid. |
| 2 | Pentabromo-diphenyloxide | 255–282° C. at 7 mm | 1.6695 at 60° C | Viscous yellow liquid. |
| 3 | Tetrabromo-phenyl-diphenyl-oxide. | | 1.6754 | Very viscous, light yellow, clear liquid. |
| 4 | Hexabromo-phenyl-diphenyl-oxide—Batch 619. | | 1.6611 | Yellow resin. |
| 5 | Hexabromo-diphenyloxide | 267–292° C. at 16 mm | >1.7 | Do. |
| 6 | Hexabromo-phenyl-diphenyl-oxide—Batch 692. | 320 at 8 mm., 340 at 9 mm | 1.661 | Do. |

Table II

| Plasticizer No. | 100 ethyl cellulose, 15 plasticizer | | | | 100 ethyl cellulose, 40 plasticizer | | | |
|---|---|---|---|---|---|---|---|---|
| | Yield point | Tensile strength | Per cent elongation | Hardness index | Yield point | Tensile strength | Per cent elongation | Hardness index |
| 1 | 460 | 720 | 41 | 97 | 340 | 520 | 37 | 72 |
| 2 | 450 | 700 | 40 | 95 | 395 | 550 | 33 | 83 |
| 3 | 535 | 700 | 32 | 112 | 540 | 600 | 24 | 107 |
| 4 | 650 | 650 | 12 | 137 | 760 | 760 | 6 | 160 |
| 5 | 520 | 695 | 32 | 110 | 505 | 520 | 12 | 103 |
| 6 | 575 | 685 | 28 | 121 | | 675 | 5 | |
| Blank | 475 | 650 | 34 | 100 | 475 | 650 | 34 | 100 |

It is observed in Table II that the hardness index of the compositions containing 15 parts of plasticizer per 100 parts of ethyl cellulose was in no instance below 95. Surprisingly enough, when as much as 40 per cent of plasticizer, based on the weight of cellulose derivative, was introduced to the composition, the hardness index in no instance was below 72,—an exceedingly high value for compositions so rich in plasticizer. By way of comparison, the same ethyl cellulose is shown in the following table plasticized with the common well known plasticizers diphenyl-phthalate, tricresyl-phosphate, dibutyl-phthalate and castor oil.

Table III

| Plasticizer | 100 ethyl cellulose, 15 plasticizer | | | | 100 ethyl cellulose, 40 plasticizer | | | |
|---|---|---|---|---|---|---|---|---|
| | Yield point, kg./cm.² | Tensile strength, kg./cm.² | Elongation, percent | Hardness index | Yield point, kg./cm.² | Tensile strength, kg./cm.² | Elongation, percent | Hardness index |
| Diphenyl-phthalate | 380 | 535 | 35 | 80 | 170 | 254 | 48 | 36 |
| Tricresyl-phosphate | 320 | 525 | 46 | 67 | 100 | 130 | 36 | 21 |
| Dibutyl-phthalate | 270 | 390 | 35 | 57 | 82 | 82 | 24 | 17 |
| Castor oil | 360 | 580 | 45 | 76 | 95 | 168 | 50 | 20 |

The same type of results, in general, are obtained when other cellulose derivatives are plasticized with the herein-described plasticizers, it being remembered that, with the exception of benzyl cellulose which is softer, most of the commercial cellulose derivatives are all inherently harder than is ethyl cellulose. This point is illustrated in the following table which shows the relative yield point hardness of several cellulose derivatives, computed on the basis that the ethyl cellulose had a hardness value of 100.

Nitro-cellulose, 6 sec. R. S._____ 167
Cellulose acetate 30–40 sec. high acetyl___ 147
Cellulose aceto-butyrate, medium viscosity__ 140
Cellulose aceto-propionate_____ 139
Ethyl cellulose 48.5% ethoxyl, 75 centipoises_ 100
Benzyl cellulose, medium viscosity_____ 86

The poly-halogenated diphenyloxide derivatives are compatible at least to the extent of 15 per cent with all of the cellulose derivatives named in the foregoing table and the 15 per cent concentration produced plastics having a hardness index of at least 90.

An extrusion coating for wire was made up to contain the following ingredients:

Per cent
Ethyl cellulose 49% ethoxyl, 255 centipoise viscosity_____ 48.8
Tetrabromo-diphenyloxide _____ 48.8
Ceresin wax_____ 2.0
Pigment_____ 0.4

The composition was prepared without solvent by "colloiding" the ingredients together in a steam-heated mixer at a steam pressure of 60 lbs. per square inch. The mixture was fused and extruded onto wire in the customary manner. The coating was found to have good adherence to the wire and to provide a highly flexible insulation which not only had satisfactory dielectric properties but which possessed fairly high flame resistance,—an important attribute of insulated wires to be used around motors or circuit breakers where arcing is apt to occur.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:

1. A molding composition comprising a cellulose derivative plasticized with from 5 to 40 parts, per 100 parts of the cellulose derivative, of at least one compound having the general formula

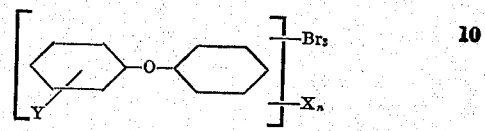

wherein Y is a member of the class consisting of the phenyl group and hydrogen, X is at least one of the halogens,—chlorine and bromine, and $n$ is a numeral from 1 to 3.

2. A composition of matter consisting of a cellulose derivative plasticized with about 15 parts, per 100 parts of the cellulose derivative, of at least one compound having the general formula

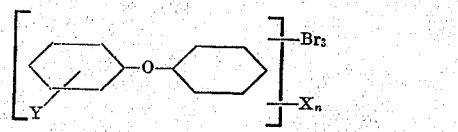

wherein Y is a member of the class consisting of the phenyl group and hydrogen, X is at least one of the halogens,—chlorine and bromine, and $n$ is a numeral from 1 to 3, said composition having a hardness at least 90 per cent that of the cellulose derivative alone.

3. A composition of matter comprising a cellulose ether and from 5 to 40 parts, per 100 parts of the cellulose ether, of at least one compound having the formula

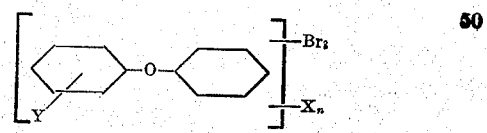

wherein Y is a member of the class consisting of the phenyl group and hydrogen, X is at least one of the halogens,—chlorine and bromine, and $n$ is a numeral from 1 to 3.

4. A composition of matter comprising a cellulose ester and from 5 to 40 parts, per 100 parts of the cellulose ester, of at least one compound having the general formula

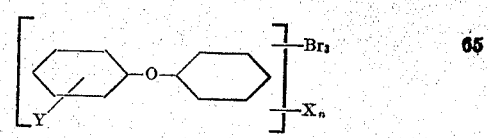

wherein Y is a member of the class consisting of the phenyl group and hydrogen, X is at least one of the halogens,—chlorine and bromine, and $n$ is a numeral from 1 to 3.

5. A composition of matter comprising ethyl cellulose and from 5 to 40 parts, per 100 parts of the ethyl cellulose, of at least one compound having the general formula
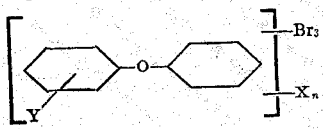
wherein Y is a member of the class consisting of the phenyl group and hydrogen, X is at least one of the halogens,—chlorine and bromine, and $n$ is a numeral from 1 to 3.
SHAILER L. BASS.
EDGAR C. BRITTON.